United States Patent
Ochi et al.

[11] Patent Number: 6,094,245
[45] Date of Patent: Jul. 25, 2000

[54] PROJECTION LCD HAVING A SHEET POLARIZER WITH PROTECTIVE LAYERS ON BOTH SIDES THEREOF

[75] Inventors: Tetsuro Ochi; Hisao Kitai; Mikiya Kobayashi, all of Kanagawa, Japan

[73] Assignee: Sony Corporation, Tokyo, Japan

[21] Appl. No.: 08/957,934

[22] Filed: Oct. 27, 1997

[30] Foreign Application Priority Data

Oct. 28, 1996 [JP] Japan ................................ 8-285050

[51] Int. Cl.[7] ..................... G02F 1/1333; G02F 1/1335
[52] U.S. Cl. .......................... 349/96; 349/138; 349/122
[58] Field of Search ............................. 349/96, 5, 138, 349/122

[56] References Cited

U.S. PATENT DOCUMENTS

| | | | |
|---|---|---|---|
| 4,387,133 | 6/1983 | Ichikawa et al. | 428/215 |
| 4,592,623 | 6/1986 | Yamamoto et al. | 349/96 |
| 5,818,559 | 10/1998 | Yoshida | 349/122 |
| 5,838,415 | 11/1998 | Hayashi et al. | 349/8 |
| 5,880,800 | 3/1999 | Mikura et al. | 349/122 |

FOREIGN PATENT DOCUMENTS

| | | |
|---|---|---|
| 9517699 | 6/1995 | WIPO . |
| 9701780 | 1/1997 | WIPO . |
| 9701781 | 1/1997 | WIPO . |

*Primary Examiner*—William L. Sikes
*Assistant Examiner*—Toan Ton
*Attorney, Agent, or Firm*—Hill & Simpson

[57] ABSTRACT

A liquid crystal projector has a pre-sheet polarizer and an incoming light side sheet polarizer on the incoming light side of a liquid crystal panel. Two sheet polarizers superimposed to each other are stuck on the outgoing light side face of the liquid crystal panel. The degree of polarization of the pre-sheet polarizer is smaller than that of the incoming light side sheet polarizer, so that both the sheet polarizers suitably share the quantity of absorbed light. Similarly, the degree of polarization of the incoming light side one of the sheet polarizers stuck on the outgoing light side face of the liquid crystal panel is smaller than that of the other one, so that both the sheet polarizers suitably share the quantity of absorbed light. With this configuration, the durability of the sheet polarizer is improved and the light output is increased.

10 Claims, 2 Drawing Sheets

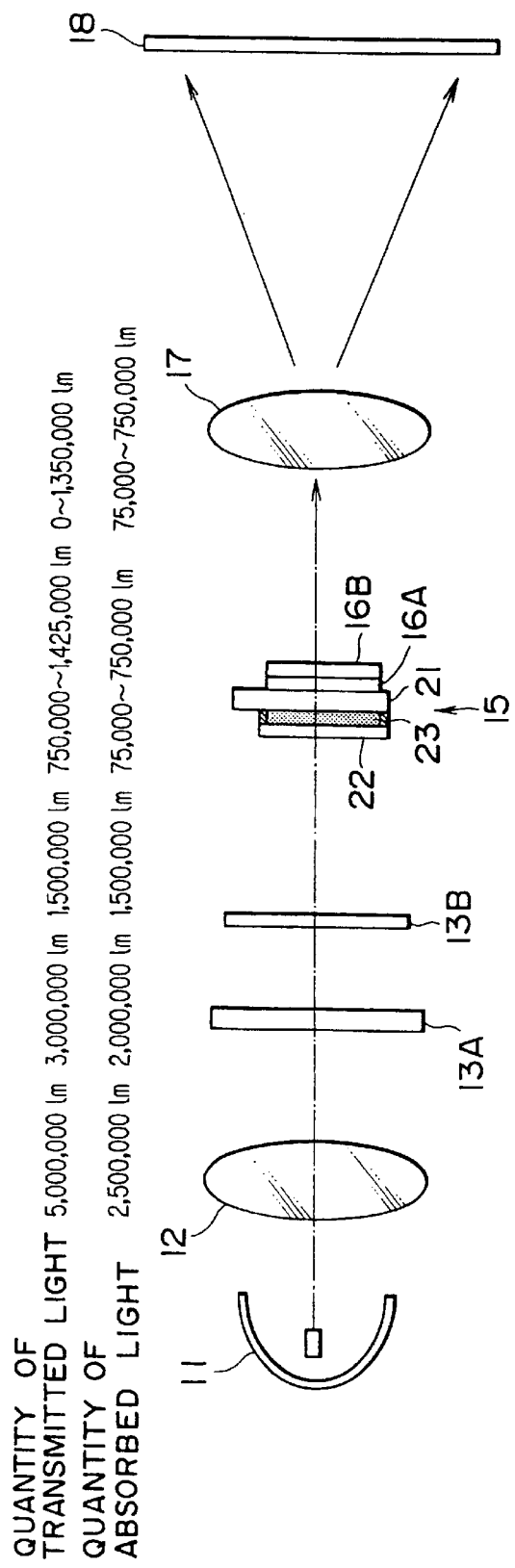

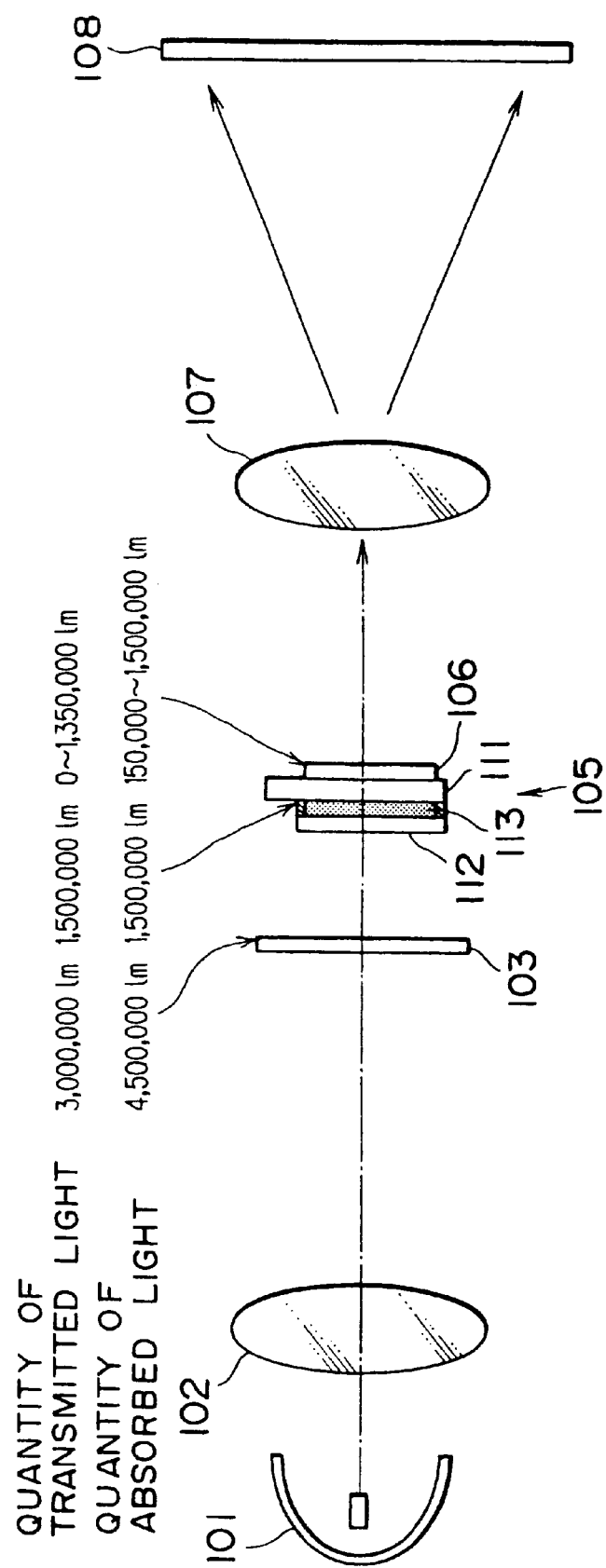

PROJECTION LCD HAVING A SHEET POLARIZER WITH PROTECTIVE LAYERS ON BOTH SIDES THEREOF

BACKGROUND OF THE INVENTION

The present invention relates to a liquid crystal display used for a liquid crystal projector and a sheet polarizer for the liquid crystal display.

A liquid crystal projector projects an image on a liquid crystal panel onto a screen on an enlarged scale using a projecting optical system. FIG. 3 shows one configuration of an optical system of a related art liquid crystal projector. The liquid crystal projector includes a lamp 101 for emitting light, a condenser lens 102 for condensing the light emitted from the lamp 101, an incoming light side sheet polarizer 103, an aperture 104, a liquid crystal panel 105, an outgoing light side sheet polarizer 106, and a projecting lens 107. The incoming light side sheet polarizer 103, which is referred sometimes to "a sheet polarizer before liquid crystal", allows only a specific polarized light component of the light condensed through the condenser lens 102 to pass therethrough. The aperture 104 has an aperture ratio of typically 50% for allowing 50% of the light component having passed through the incoming side sheet polarizer 103 to pass therethrough. The liquid crystal panel 105 has a number of pixels, and it allows the light component having passed through the aperture 104 to enter therein. The pixels are arranged, for example, in a grid pattern and are each capable of selecting a suitable optical rotatory power under a suitable electric field. The outgoing light side sheet polarizer 106, which is sometimes referred to as "a sheet polarizer after liquid crystal", is stuck on an outgoing light side face of the liquid crystal panel 105, and it allows only a specific polarized light component of the outgoing light component from the liquid crystal panel 105 to pass therethrough. The projecting lens 107 is adapted to project the light component having passed through the outgoing side sheet polarizer 106 on a screen 108 on an enlarged scale.

The liquid crystal panel 105 includes a drive substrate 111 on which a switching element using, for example, a thin film transistor (TFT) is formed for each pixel; a counter substrate 112 arranged opposite to the drive substrate 111 with a specific distance put therebetween; and liquid crystal 113 filled between the drive substrate 111 and the counter substrate 112. The liquid crystal panel 105 has, if needed, a color filter and the like for color display. In such a liquid crystal panel 105, the counter substrate 112 is disposed on the incoming light side; the drive substrate 111 is disposed on the outgoing light side; and the outgoing light side sheet polarizer 106 is stuck on the drive substrate 111.

In the liquid crystal projector shown in FIG. 3, light emitted from the lamp 101 is condensed through the condenser lens 102, and the condensed light enters in the incoming light side sheet polarizer 103. Only a specific polarized light component passes through the incoming light side sheet polarizer 103 as linearly polarized light. In the example shown in FIG. 3, at the incoming light side sheet polarizer 103, the quantity of transmitted light is taken as 3,000,000 lm, and the quantity of absorbed light is taken as 4,500,000 lm. The light having passed through the incoming light side sheer polarizer 103 enters in the liquid crystal panel 105. Assuming that the rate of aperture area is 50%, 50% of the incoming light component is cut off, and the remaining light component is selected in terms of optical rotatory power for each pixel and goes out of the liquid crystal panel 15 as elliptically polarized light suitable for each pixel. In the example shown in FIG. 3, at the liquid crystal panel 105, the quantity of transmitted light is taken as 1,500,000 lm, and the quantity of absorbed light is taken as 1,500,000 lm. The outgoing light from the liquid crystal panel 105 enters in the outgoing light side sheet polarizer 106. Here, the light component passes through the outgoing light side sheet polarizer 106 selectively for each pixel in accordance with the optical rotatory power for each pixel in the liquid crystal panel 105. In the example shown in FIG. 3, at the outgoing light side sheet polarizer 106, the quantity of transmitted light is taken as 0–1,350,000 lm, and the quantity of absorbed light is taken as 150,000–1,500,000 lm. The light having passed through the outgoing light side sheet polarizer 106 is projected on the screen 108 on an enlarged scale by the projecting lens 107, to form an image.

In the related art transmission type liquid crystal projector shown in FIG. 3, the two organic (iodine, dye) based sheet polarizers 103 and 106, each of which is substantially of the direct-vision type, are essentially provided as optical members before and after the liquid crystal panel 105, respectively. Also the existing liquid crystal projector is required to be increased in quantity of light, because the efficiency of the lamp 101 is low and the image is dark. In the related art liquid crystal projector, however, since the quantities of light absorbed by the sheet polarizers 103 and 106 become larger with the increased quantity of light, there is a fear that the sheet polarizers 103 and 106 are degraded by thermal energy or the like caused by light absorption at the sheet polarizers 103 and 106. As a result, the entire performance of the liquid crystal projector cannot be enhanced only by improving the durability of a single sheet polarizer with the related art configuration being left as it is.

In the related art liquid crystal projector, the sheet polarizers 103 and 106 and the liquid crystal panel 105 are air-cooled. However, for a liquid crystal projector used for AV (audio video), air-cooling cannot be sufficiently performed because of a limitation in terms of noise.

A thin polarizer directly contributing to polarization, which is low in humidity resistance, is generally used in the form of a sheet polarizer in which the polarizer is held between resin made protective layers for increasing the durability. However, the resin forming the protective layer generates heat, and thereby it shortens the service life of the sheet polarizer. Further, the resin having a low heat conductivity is liable to store the heat generated therein.

As the incoming light side sheet polarizer, an inorganic type polarizer such as a polarization beam splitter has been developed. However, the polarization beam splitter is very high in cost, and it is difficult to be adopted as a product for consumer use. For this reason, it is expected to develop a planar type polarization beam splitter; however, it is in the course of development and is poor in mass-production.

To increase the cooling efficiency of the liquid crystal panel 105, the outgoing light side sheet polarizer 106 should be separated from the liquid crystal panel 105; however, according to the existing technique, since unnecessary light caused by a difference in refractive index between the drive substrate 111 and air exerts adverse effect on operation of switching elements using TFTs or the like in the drive substrate 111 and in the worst case it makes impossible the driving, there is a limitation that the outgoing light side sheet polarizer 106 must be stuck on the drive substrate 111. Specifically, in the existing liquid crystal projector, the liquid crystal panel 105 must be used in such an undesirable state for cooling that the liquid crystal panel 105 and the outgoing light side sheet polarizer 106, each of which is a source of heat generation, must be integrated with each other.

SUMMARY OF THE INVENTION

A first object of the present invention is to provide a liquid crystal display of improving durability of a sheet polarizer and increasing the output light.

A second object of the present invention is to provide a sheet polarizer for a liquid crystal display, which is prolonged in service life.

To achieve the above objects, according to a first aspect of the present invention, there is provided a liquid crystal display including: a liquid crystal panel modulating incoming light for each pixel; a first polarizing means, disposed on an incoming light side of the liquid crystal panel, for allowing only a specific polarized light component to pass therethrough; and a second polarizing means, disposed on an outgoing light side of the liquid crystal panel, for allowing only a specific polarized light component to pass therethrough; wherein at least one of the first and second polarizing means is composed of a plurality of sheet polarizers arranged along a light path.

According to a second aspect of the present invention, there is provided a projection type display including: a light source; a liquid crystal display into which light emitted from the light source enters, the liquid crystal display having a liquid crystal panel; a first polarizing means, disposed on an incoming light side of the liquid crystal panel, for allowing only a specific polarized light component to pass therethrough; and a second polarizing means, disposed on an outgoing light side of the liquid crystal panel, for allowing only a specific polarized light component to pass therethrough; wherein at least one of the first and second polarizing means is composed of a plurality of sheet polarizers arranged along a light path; and a means for projecting and displaying a display image of the liquid crystal panel on an enlarged scale.

In the above liquid crystal display and projection type display, since the plurality of sheet polarizers share the quantity of absorbed light at least on one side of the incoming light side sheet polarizer and the outgoing light side sheet polarizer, the degradation of each sheet polarizer due to heat generation amount and light energy is reduced, so that the durability of each sheet polarizer is improved and the output light is increased.

In the above liquid crystal display and projection type display, preferably, the liquid crystal panel includes a first substrate in which a switching element is formed for each pixel, a second substrate disposed opposite to the first substrate, and a liquid crystal layer held between the first and second substrates. Further, preferably, the first substrate is disposed on the outgoing light side, and the second polarizing means includes a plurality of sheet polarizers superimposed to each other along the light path and is stuck on the first substrate. With this configuration, it is possible to eliminate occurrence of unnecessary light due to a difference in refractive index between the drive substrate and air.

In the liquid crystal display and projection type display, preferably, each of the plurality of sheet polarizers includes a polarizer, and protective layers put on both sides of the polarizer.

In the liquid crystal display, preferably, the protective layer has a light absorptance in a range of 0 to 1%. With this configuration, the quantity of absorbed light in the protective layer is suppressed, as a result of which the heat generation amount of each sheet polarizer is reduced and thereby the service life of the sheet polarizer is prolonged.

In the liquid crystal display, preferably, the protective layer has a heat conductivity of 0.8 W or more. With this configuration, the cooling efficiency of the sheet polarizer is improved, so that the service life of the sheet polarizer is prolonged.

BRIEF DESCRIPTION OF THE DRAWINGS

FIG. 1 is a schematic view illustrating a configuration of an optical system of a liquid crystal projector as a liquid crystal display according to one embodiment of the present invention;

FIG. 2 is a sectional view showing a sheet polarizer in FIG. 1; and

FIG. 3 is a schematic view illustrating one example of an optical system of a related art liquid crystal projector.

DETAILED DESCRIPTION OF THE PREFERRED EMBODIMENTS

Hereinafter, one embodiment of the present invention will be described in detail with reference to the accompanying drawings.

FIG. 1 is a view illustrating a configuration of an optical system of a liquid crystal projector using a liquid crystal display according to one embodiment of the present invention. The liquid crystal projector includes a lamp 11 for emitting light, a condenser lens 12 for condensing the light emitted from the lamp 11, a pre-sheet polarizer 13A, and an incoming light side sheet polarizer 13B. The pre-sheet polarizer 13A allows a specific polarized light component of the light condensed through the condenser lens 12 to pass therethrough at a specific degree of polarization. The incoming light side sheet polarizer 13B allows a specific polarized light component of the light component having passed through the pre-sheet polarizer 13A to pass therethrough at a specific degree of polarization. The liquid crystal projector also includes a liquid crystal panel 15, a sheet polarizer 16A, a sheet polarizer 16B, and a projecting lens 17. The liquid crystal panel 15 has a number of pixels, and it allows the light component having passed through the incoming light side sheet polarizer 13B to enter therein. The pixels are arranged, for example, in a grid pattern and are each capable of selecting a suitable optical rotatory power (optical characteristic) under a suitable electric field. The sheet polarizer 16A is stuck on the outgoing light side face of the liquid crystal panel 15, and it allows a specific polarized light component of the outgoing light component from the liquid crystal panel 15 to pass therethrough at a specific degree of polarization. The sheet polarizer 16B is stuck on the outgoing light side face of the sheet polarizer 16A, and it allows a specific polarized light component of the outgoing light component from the sheet polarizer 16A to pass therethrough at a specific degree of polarization. The projecting lens 17 is adapted to project the light component having passed through the sheet polarizer 16B on a screen 18 on an enlarged scale.

The pre-sheet polarizer 13A and the incoming light side sheet polarizer 13B, which are equivalent to the incoming light side polarizing means of the present invention, allow the same polarized light component to pass therethrough. The degree of polarization of the pre-sheet polarizer 13A, however, is smaller than that of the incoming light side sheet polarizer 13B, so that both the pre-sheet polarizer 13A and the incoming light side sheet polarizer 13B suitably share the quantity of absorbed light. Also, the total of the degrees of polarization of the pre-sheet polarizer 13A and the incoming light side sheet polarizer 13B is set at a specific value, typically, 99.95% or more.

Similarly, the sheet polarizers 16A and 16B, which are equivalent to the outgoing light side polarizing means of the present invention, allow the same polarized light component to pass therethrough. The degree of polarization of the sheet polarizer 16A, however, is smaller than that of the sheet polarizer 16B, so that both the sheet polarizers 16A and 16B suitably share the quantity of absorbed light. Also, the total of the degrees of polarization of the sheet polarizers 16A and 16B is set at a specific value, typically, 99.95% or more.

Assuming that partially polarized light is a composition of natural light and polarized light, the degree of polarization is expressed by a relationship of Ip/(Ip+In) where In is an intensity of natural light and Ip is an intensity of polarized light. The larger the degree of polarization, the smaller the transmittance of incoming natural light, that is, the larger the absorptance thereof. The natural light transmittance of each of the pre-sheet polarizer 13A and the sheet polarizer 16A is set at, for example, 60% or more, and the natural light transmittance of the incoming light side sheet polarizer 13B and the sheet polarizer 16B is set at, for example, 43% or less.

The liquid crystal panel 15 includes a drive substrate 21 in which a switching element typically using a thin film transistor (TFT) is formed for each pixel; a counter substrate 22 disposed opposite to the drive substrate 21 with a specific distance put therebetween; and liquid crystal 23 filled between the drive substrate 21 and the counter substrate 22. The liquid crystal panel 15 also includes a color filter and the like for color display, as needed. In the liquid crystal panel 15, the counter substrate 22 is disposed on the incoming light side; the drive substrate 21 is disposed on the outgoing light side; and the sheet polarizer 16A is stuck on the drive substrate 21.

Next, the function of the liquid crystal projector according to this embodiment will be described. In this liquid crystal projector, light emitted from the lamp 11 is condensed through the condenser lens 12; the condensed light enters in the pre-sheet polarizer 13A, through which a specific polarized light component passes at a specific degree of polarization; and the outgoing light component from the pre-sheet polarizer 13A enters in the incoming light side sheet polarizer 13B, through which a specific polarized light component passes at a specific degree of polarization. As a result, the outgoing light component from the incoming light side sheet polarizer 13B becomes linearly polarized light. In the example shown in FIG. 1, at the pre-sheet polarizer 13A, the quantity of transmitted light is taken as 5,000,000 lm and the quantity of absorbed light is taken as 2,500,000 lm; and at the incoming light side sheet polarizer 13B, the quantity of transmitted light is taken as 3,000,000 lm and the quantity of absorbed light is taken as 2,000,000 lm. The light component having passed through the incoming light side sheet polarizer 13B enters in the liquid crystal panel 15. Assuming that the rate of aperture area is 50%, 50% of the incoming light component is cut off, and the remaining light component is selected in terms of optical rotatory power for each pixel and goes out of the liquid crystal panel 15 as elliptically polarized light for each pixel. In the example shown in FIG. 1, at the crystal panel 15, the quantity of transmitted light is taken as 1,500,000 lm and the quantity of absorbed light is taken as 1,500,000 lm. The outgoing light from the liquid crystal panel 15 enters in the sheet polarizer 16A. At the sheet polarizer 16A, the quantity of transmitted light is changed selectively for each pixel in accordance with the optical rotatory power for each pixel in the liquid crystal panel 15. In the example shown in FIG. 1, at the sheet polarizer 16A, the quantity of transmitted light is taken as 750,000–1,425,000 lm and the quantity of absorbed light is taken as 75,000–750,000 lm. The light having passed through the sheet polarizer 16A enters in the sheet polarizer 16B. At the sheet polarizer 16B, the quantity of transmitted light is changed selectively for each pixel in accordance with the optical rotatory power for each pixel in the liquid crystal panel 15. In the example shown in FIG. 1, at the sheet polarizer 16B, the quantity of transmitted light is taken as 0–1,350,000 lm and the quantity of absorbed light is taken as 75,000–750,000 lm. The light component having passed through the sheet polarizer 16B becomes linearly polarized light, and is projected by the projecting lens 17 on the screen 18 on an enlarged scale, to form an image.

In the related art configuration shown in FIG. 3, for black display using the liquid crystal projector having a light output of 1,350,000 lm at maximum, the outgoing light side sheet polarizer 106 absorbs light in a quantity of about 1,500,000 lm. As a result, for the liquid crystal projector using the liquid crystal panel 105 of a 0.5–3 inch class, the outgoing light side sheet polarizer 106 tends to be degraded. For this reason, in the liquid crystal projector using the liquid crystal panel 105 of a 0.5–3 inch class, the light output has been limited to hundreds of thousands lm to ensure the service life of tens of thousands hours.

On the contrary, in the liquid crystal projector according to this embodiment shown in FIG. 1, since the outgoing light side sheet polarizer is of the two-layered structure of the sheet polarizers 16A and 16B which share the quantity of absorbed light, for example, half-and-half, it becomes possible to reduce degradation of each of the sheet polarizers 16A and 16B due to heat generation amount and light energy, and hence to improve the durability of each of the sheet polarizers 16A and 16B. Similarly, since the pre-sheet polarizer 13A is provided before the incoming light side sheet polarizer 13B and both the sheet polarizers 13A and 13B share the quantity of absorbed light, it becomes possible to reduce degradation of each of the sheet polarizers 13A and 13B due to heat generation amount and light energy, and hence to improve the durability of each of the sheet polarizers 13A and 13B. Thus, the liquid crystal projector using the liquid crystal panel 15 of a 0.5–3 inch class allows the light output of millions lm while ensuring the service life of tens of thousands hours. As a result, the liquid crystal projector, which has been used only at a dark location, can be used at a bright location.

In the liquid crystal projector according to this embodiment, since the two-layered sheet polarizers 16A and 16B on the outgoing light side are stuck on the drive plate 21 of the liquid crystal panel 15, it is possible to eliminate occurrence of unnecessary light due to a difference in refractive index between the drive substrate 21 and air, and hence to use any drive substrate 21 for the liquid crystal projector.

In the liquid crystal projector according to this embodiment, since the sheet polarizers 13A and 13B and the sheet polarizers 16A and 16B are arranged in the order of increasing the degree of polarization from the incoming light side to finally obtain a specific degree of polarization, it is possible to obtain a good image.

Incidentally, as shown in FIG. 2, a sheet polarizer 30 used for the sheet polarizers 13A, 13B, 16A and 16B includes a thin polarizer 31 directly contributes to polarization, and protective layers 32 and 33 are put on both the sides of the polarizer 31. In a related art sheet polarizer, since a protective layer is made from a resin having a large light absorptance at a relatively short wavelength, the heat generation amount of the protective layer is large, resulting in the shortened the service life of the sheet polarizer. On the other hand, in the liquid crystal projector according to this embodiment, each of the protective layers 32 and 33 is made from a resin having a small light absorptance such that the light absorptance of each of the protective layers 32 and 33 becomes a value of 0 to 1%. This suppresses the quantity of absorbed light and the heat generation amount of each of the protective layers 32 and 33, to reduce the heat generation amount of the sheet polarizer 30, thereby prolonging the service life of the sheet polarizer 30. The resin having a small light absorptance is represented by triacetyl cellulose (TAC).

In the sheet polarizer 30 shown in FIG. 2, each of the protective layers 32 and 33 may be made from a material having a high heat conductivity, for example, glass such that the heat conductivity of each of the protective layers 32 and 33 becomes 0.8 W/K or more. This improves a cooling efficiency of the sheet polarizer 30 and thereby prolongs the service life of the sheet polarizer 30. The material having a high heat conductivity is represented by Ten Pax Glass (trade name, produced by Shot Co., Ltd.)

The polarizer 31 is formed of typically a uniaxial oriented polyvinyl alcohol film dyed by iodine or dichromatic dye. The thickness thereof is typically in a range of 20 to 30 $\mu$m. Also, the thickness of each of the protective layers 32 and 33, which is formed of a material having a high heat conductivity such as glass, is typically in a range of about 0.7 to 1.1 mm.

The protective layers 32 and 33 made from a material having a high heat conductivity are effective to increase the cooling efficiency of the sheet polarizer 30, and hence to simplify the cooling structure of the liquid crystal projector. This enables high density arrangement of parts of the liquid crystal projector, which leads to miniaturization of the liquid crystal projector. Further, it is possible to make smaller the wind speed upon air cooling, and hence to provide the liquid crystal projector of reducing noise suitable for application of AV. In addition, the protective layers 32 and 33 made from glass allow the holding force of the polarizer 30 to be strengthened.

While the preferred embodiment of the present invention has been described, such description is for illustrative purposes only, and it is to be understood that many changes and variations may be made without departing from the scope of the following claims. For example, although the two sheet polarizers for sharing the quantity of absorbed light are provided on each of the incoming light side and the outgoing light side of the liquid crystal panel 15, three or more of sheet polarizers for sharing the quantity of absorbed light may be provided at least one of the incoming light side and the outgoing light side of the liquid crystal panel 15. Further, the present invention includes a configuration in which a plurality of sheet polarizers for sharing the quantity of absorbed light are provided only on the incoming light side or the outgoing light side of the liquid crystal panel 15.

What is claimed is:

1. A liquid crystal display comprising:
   a liquid crystal panel modulating incoming light for each pixel;
   a first polarizing means, disposed on an incoming light side of said liquid crystal panel, for allowing only a specific polarized light component to pass therethrough; and
   a second polarizing means, disposed on an outgoing light side of said liquid crystal panel, for allowing only a specific polarized light component to pass therethrough;
   wherein at least one of said first and second polarizing means is composed of a plurality of sheet polarizers arranged along a light path, each of said plurality of sheet polarizers comprising a polarizer, and protective layers on both sides of said polarizer.

2. A liquid crystal display according to claim 1, wherein said plurality of sheet polarizers are arranged in the order of increasing the degree of polarization from the incoming light side.

3. A liquid crystal display according to claim 1, wherein said liquid crystal panel comprises a first substrate in which a switching element is formed for each pixel, a second substrate disposed opposite to said first substrate, and a liquid crystal layer held between said first and second substrates.

4. A liquid crystal display according to claim 3, wherein said first substrate is disposed on the outgoing light side, and said second polarizing means comprises a plurality of sheet polarizers superimposed to each other along the light path and is stuck on said first substrate.

5. A liquid crystal display according to claim 1, wherein said protective layer has a light absorptance in a range of 0 to 1%.

6. A liquid crystal display according to claim 1, wherein said protective layer has a heat conductivity of 0.8 W or more.

7. A projection type display comprising:
   a light source;
   a liquid crystal display into which light emitted from said light source enters,
   said liquid crystal display having a liquid crystal panel; a first polarizing means, disposed on an incoming light side of said liquid crystal panel, for allowing only a specific polarized light component to pass therethrough; and a second polarizing means, disposed on an outgoing light side of said liquid crystal panel, for allowing only a specific polarized light component to pass therethrough; wherein at least one of said first and second polarizing means is composed of a plurality of sheet polarizers arranged along a light path, each of said plurality of sheet polarizers comprising a polarizer, and protective layers on both sides of said polarizer; and
   a means for projecting and displaying a display image of said liquid crystal panel on an enlarged scale.

8. A projection type display according to claim 7, wherein said plurality of sheet polarizers are arranged in the order of increasing the degree of polarization from the incoming light side.

9. A projection type display according to claim 7, wherein said liquid crystal panel comprises a first substrate in which a switching element is formed for each pixel, a second substrate disposed opposite to said first substrate, and a liquid crystal layer held between said first and second substrates.

10. A projection type display according to claim 7, wherein said first substrate is disposed on the outgoing light side, and said second polarizing means comprises a plurality of sheet polarizers superimposed to each other along the light path and is stuck on said first substrate.

* * * * *